United States Patent [19]

Kanakaris

[11] 4,373,411
[45] Feb. 15, 1983

[54] EXPANSIBLE MANDREL

[75] Inventor: Georges Kanakaris, Tremblay, France

[73] Assignee: Santrade Ltd., Lucerne, Switzerland

[21] Appl. No.: 233,456

[22] Filed: Feb. 11, 1981

[30] Foreign Application Priority Data

Feb. 19, 1980 [FR] France .................. 80 03548

[51] Int. Cl.³ ............................................. B23B 31/42
[52] U.S. Cl. ........................................ 82/44; 279/2 R
[58] Field of Search ............................... 82/44; 279/2

[56] References Cited

U.S. PATENT DOCUMENTS

Re. 26,248  8/1967  Anthony ................... 279/2 X
4,121,847 10/1978  Morawski ................. 279/2 R Primary Examiner—James M. Meister
Attorney, Agent, or Firm—Burns, Doane, Swecker & Mathis

[57] ABSTRACT

An expansible mandrel for loading and unloading a work member while the mandrel is rotating, comprises a frame having an abutment and a mandrel body slidable in the frame. Two slide members are mounted for radial movement within first recesses in the body and each include a radial projection for pressing the work member against the abutment and an inclined surface facing radially inwardly. A piston is movable relative to the body and includes an inclined surface engageable with the inclined surfaces of the slides. A first spring urges the piston rearwardly to bring its inclined surface into engagement with the inclined surfaces of the slides and urge the latter radially outwardly into engagement with the work member. A second spring urges the body and slides forwardly. A coupling rod moves forwardly by a first distance to become disengaged from the body to enable the body and slides to be pushed forwardly by the second spring, and moves further by a second distance to push the piston forwardly against the bias of the first spring. The coupling rod moves rearwardly by the second distance to enable the first spring to push the piston rearwardly, and moves further by the first distance to engage the body and pull the latter rearwardly. Two weight members are mounted in second recesses of the body for radial movement. A mechanical linkage operably interconnects the weight members and respective ones of the slides such that centrifugally-induced radial outward movement of the weight members produces radial inward movement of the slides and their projections when the piston is moved forwardly.

11 Claims, 2 Drawing Figures

EXPANSIBLE MANDREL

BACKGROUND AND OBJECTS OF THE INVENTION

The present invention concerns an expansible mandrel in which loading and unloading of the member to be machined is effected while the mandrel is rotating.

The known installations make use of mandrels with slide members which are held in place by a resilient circular ring. The use of such mandrels makes it necessary to stop the machine whenever the machined member is to be removed and replaced on the mandrel by a fresh member to be machined.

Indeed, using such a known mandrel for machining members on permanently rotating machine tools is not to be recommended and is even dangerous. The return force of the resilient ring, by virtue of the effect of centrifugal force acting on the slide members, is insufficient to return the slide members to the release position. In addition, there is the danger of the ring breaking due to the effect of centrifugal force.

The aim of the present invention is to overcome this disadvantage and to provide a mandrel having a positive release system which comprises using centrifugal force to cause retraction of the slide members into apertures provided in the body of the mandrel, to permit ejection of the machined member and loading of the mandrel with a fresh member to be machined.

SUMMARY OF A PREFERRED EMBODIMENT OF THE INVENTION

In accordance with the invention, a mandrel is characterized in that, at the front of the mandrel, the member to be machined is successively entered and gripped between the side face of a radial projection of each of at least two slide members and an abutment which is fixed on or forms an integral part of the plate for fixing the mandrel on the machine tool, the slide members being disposed in apertures provided in the body of the mandrel so as to be capable of movement radially with respect to the longitudinal axis of the mandrel, the action of centering and gripping the member to be machined being controlled by a piston provided with a conical portion (or ramps), at its end, which is in contact with corresponding conical surfaces of said slide members, said piston being urged rearwardly of the mandrel by the action of a first spring after being freed by the coupling rod for controlling, gripping, and release of said member to be machined, definitive gripping of said member being effected by said coupling rod after it has covered a distance equal to a radial centering travel to move back by a distance equal to a face gripping (or release) travel against the force of a second spring; release of the member to be machined being effected positively by centrifugal force acting on weight members disposed in apertures in the body of the mandrel and each connected by a mechanical chain to each slide member so that each weight member, by its radial displacement resulting from the action of centrifugal force outwardly with respect to the longitudinal axis of the mandrel, by way of the mechanical chain, and after movement forwardly of the mandrel of the gripping (or release) piston under the effect of a forward movement of said control coupling rod for release of the member, acts on each slide member so that the slide member moves radially towards the longitudinal axis of the mandrel until the projection of each slide member is retracted for completely releasing the member to be machined and permitting ejection thereof, before loading a fresh member to be machined.

In accordance with another feature of the mandrel, when the member to be machined is released and when each weight member, due to the action of centrifugal force, is displaced radially outwardly in its housing in the body of the mandrel, a first ramp disposed in a recess provided in the forward portion of the weight member and having a slope which rises rearwardly cooperates with the rearward end of a movement transmission member of which the other end cooperates with a second ramp which is disposed in a recess provided in the rearward portion of each corresponding slide member and which has a slope rising forwardly so that each slide member is moved towards the longitudinal axis of the mandrel when each corresponding weight member moves away from the longitudinal axis of the mandrel.

In accordance with yet another feature of the invention, said movement transmission member is a spindle whose ends are frustoconical portions of a length such that each slide member is retained in its aperture upon total release of the member to be machined.

In accordance with yet another feature of the invention, the transmission member may be in the form of a series or a chain of adjacent balls.

The mandrel according to the invention is also noteworthy in that the ramp, in each weight member, and/or ramp, in each slide member, are the surface of a conical recess provided in said weight member and/or said slide member and that the weight of each weight member is greater than that of the corresponding slide member.

In accordance with yet another feature of the invention, a safety clearance is provided between the body of the mandrel and the plate, being capable of being absorbed when the mandrel is not loaded with a member to be machined.

The advantages of the mandrel according to the invention are many: it can, in fully safety, operate at high rotary speeds; the slide members cannot leave their housing under the effect of centrifugal force; simplicity of construction; and precision in operation.

THE DRAWINGS

Other advantages and features will be apparent from the following description which is given by way of example, and the drawings relating thereto:

FIG. 1 shows a view in longitudinal section of an embodiment given by way of example of the mandrel according to the invention, in a position for gripping the member to be machined; and FIG. 2 is a view in longitudinal section of the mandrel of FIG. 1, in the position of releasing the member to be machined.

DETAILED DESCRIPTION OF A PREFERRED EMBODIMENT OF THE INVENTION

Figure 1:
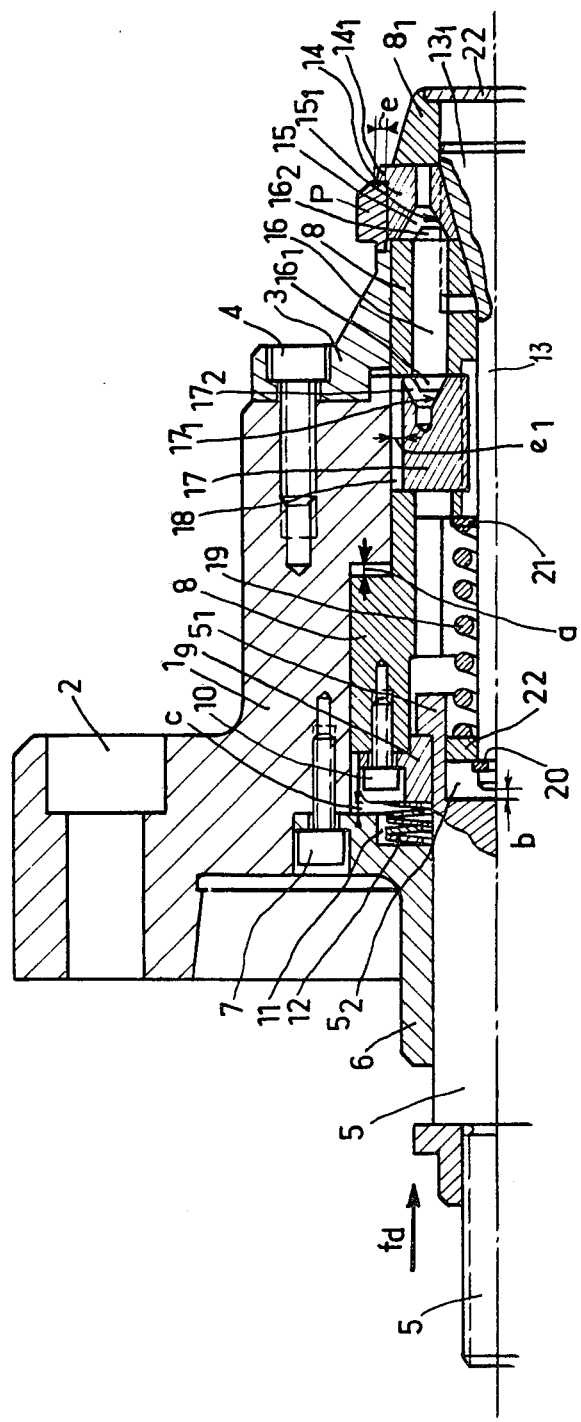

In the drawings, the mandrel comprises a plate or frame 1 which is fixed to the machine tool by screws or bolts 2. An abutment 3 is screwed on the forward portion of the plate 1, by screw means 4. A coupling rod 5 which is disposed at the rear of the mandrel is actuated in the direction of the arrow fs (FIG. 2) for gripping a member P to be machined and in the direction of the arrow fd (FIG. 1) for releasing the work member P. The mode of operation of the rod 5 may be manual, hydraulic, pneumatic, electro-mechanical or mechanical.

The rod 5 is guided in a member 6 which is fixed to the plate 1 by screws 7. A circular recess 11 is provided in the member 6 for housing therein a spring 12 which bears at the rear against the face of the recess 11 and at the front against a ring 9 which is fixed on the mandrel body 8 by screws 10.

In the condition of gripping the member P, there is a clearance c between the ring 9 and the guide member 6. The clearance c is a safety clearance, in the event that the mandrel rotates without being loaded with a member 7. The rod 5, in its forward portion, is provided with a recess $5_2$; at its forward end, the wall of the recess $5_2$ is in the form of a flanged edge portion $5_1$ whose rearward face bears against the ring 9, thus permitting displacement in the direction of the arrow fs of the body of the mandrel when the member P to be machined is gripped. The body 8 of the mandrel is stepped; in the position of gripping the member P, a face release clearance a is provided between the body 8 and the plate 1. The body 8 is bored over its entire length. It is also provided with apertures 18 for weight members 17 and, at the front, with other apertures for slide members 14. The weight members and the slide members are displaceable radially in the above-mentioned apertures; they are displaced longitudinally at the same time as the body 8 when the body 8 is acted upon in the gripping mode (arrow fs) or in the release mode (arrow fd).

A gripping control piston 13 is displaceable in the bore in the body 8 in the direction indicated by arrow fd in the release mode, by the action of the rod 5; the rearward face of the recess $5_2$ of the rod 5 bears against the rear of the piston 13 after a radial centering clearance b has been absorbed. The piston 13 is displaceable in the direction indicated by the arrow fs under the action of a spring 19 which bears at the front against a ring 21 which is positioned on the rear of a stepped portion of the bore in the body 8 and at the rear against an abutment ring 22 which is retained on the piston by a keeper ring 20. The abutment ring 22 is in contact at its peripheral edge with the internal surface of the recess $5_2$ of the rod 5 and can therefore move with respect thereto under the force of the spring 19. The spring 19 is weaker than the spring 12, so that the spring 12 and mandrel body 8 can push the piston 13 forwardly when the mandrel body is released by forward movement of the rod 5, $5_1$.

The apertures 18 which are provided for the weight members 17 are of the same length as the weight members so that the weight members may be displaced only radially in the body 8. In the gripping position, there is a clearance $e_1$ between the weight members 17 and the plate 1. Provided in the forward portion of the weight member 17 is a conical recess $17_2$, the apex of which is disposed rearwardly; the conical slope 17 is so calculated as to provide a low level of frictional effect as between the surface of the conical slope $17_1$ and the frustoconical end $16_1$ of a spindle 16 for returning slide members 14, as will be described hereinafter. Obviously, the slope of the end $16_1$ is equal to the slope $17_1$ of the recess $17_2$. The slope $17_1$ is so positioned in the weight member that the spindle 16 can move the slide members 14 towards the longitudinal axis of the mandrel when the weight members 17 move away from the longitudinal axis of the mandrel under the action of centrifugal force (due to permanent rotation of the mandrel).

The spindle 16 is the main link of the mechanical linkage between the weight members 17 and the slide members 14. The length of the slide members 14 is equal to the length of the apertures provided in the body 8 so that they are only capable of radial movements relative to the body 8. The lower portion $14_1$ of the slide members 14 is inclined so as to cooperate with the conical portion $13_1$ of the piston 13, that is to say, to slide relative thereto when gripping and releasing the members P to be machined.

The forward end $16_2$ of the spindle 16 is also of frustoconical shape. The slope of the end $16_2$ may be the same as that of the end $16_1$ of the spine 16. A conical recess 15 is provided in the rearward portion of the slide member 14; the slope $15_1$ of the surface of the recess 15 is the same as that of the end $16_2$ of the spindle 16. The slope and the arrangement of the cone configuration are so calculated as to permit relative longitudinal displacement with a low level of friction, as between the end $14_1$ and the face of the recess 15.

It is within the scope of the present invention for the central link of the mechanical linkage between the weight members and the slide members to be in the form of a series or a chain of balls, in lieu of a spindle 16.

It is also within the scope of the invention for the recesses in the weight members and/or slide members to be in the form of a cut-out portion which is for example open upwardly and whose base is in the form of a ramp having a slope equal to that of the ends $16_1$, $16_2$ of the spindle 16 for example.

The slide members are provided in their forward portion with projections $14_1$ whose height is equal to a distance e. The distance e is shorter than the above-mentioned distance $e_1$.

The member P to be machined is gripped between the rearward face of the projections $14_1$ and the side face of the abutment 3.

It will be appreciated that at least two slide members are used for gripping the member to be machined. The example illustrated in the drawings uses three slide members. For each slide member 14, there is a corresponding spindle 16 and weight member 17. It will be evident that the slide members are identical to each other, and likewise for the spindles and the weight members.

The length of each frustoconical portion $16_1$, $16_2$ of the spindle 16 is equal to a distance x.

The mass of each weight member is greater than that of the corresponding slide member and may be for example, substantially double the mass of the slide member.

When releasing a member P, the slide members 14 move towards the longitudinal axis of the mandrel until the projections $14_1$ no longer project beyond the body 8, thus permitting ejection of the member P by a compressed air jet, for example, which is supplied from the rear of the mandrel through grooves provided in the bore in the plate 1 and the abutment 3 along the body 8 of the mandrel (the grooves are not shown in the drawings).

A cover 22A closes the bore in the body 8 of the mandrel at the front.

The mode of operation of the arrangement is as follows:

Releasing the Member P

The coupling rod 5 moves forward in the direction indicated by the arrow fd and frees the mandrel body 8.

The latter moves forward under the action of the spring 12, absorbing the clearance a. The forward portion $8_1$ of the body 8 has moved forward over a distance equal to the clearance a, and also the slide members 14. This means that the member P to be machined is released.

The coupling rod 5 continues its movement in the direction of the arrow fd. After the radial centering clearance b is absorbed, the coupling rod 5 bears against the rearward end of the piston 13. The piston moves further forwardly in the direction indicated by arrow fd and, by means of the spring 19, constrains the mandrel body 8, the weight members 17, the spindles 16 and the slide members 14 against rearward motion.

Simultaneously, the conical portion $13_1$ of the piston moves forwardly relative to the mandrel body, thereby uncovering the bottoms of the apertures housing the slide members 14. By virtue of the action of centrifugal force, the weight members 17, in the apertures provided in the body 8, are displaced radially, moving away from the longitudinal axis of the mandrel; the clearance $e_1$ is reduced. The rear frustoconical ends 16 of the spindles 16 slide along the slopes $17_1$ of the recesses $17_2$ of the weight members 17 in the direction of the arrow fd (that is to say, towards the right in the drawing) over a distance which is necessarily less than the distance x. The effect of this movement of the spindles 16 towards the right in the drawing is that the frustoconical ends $16_2$ of the spindles 16 which cooperate with the inclined faces $15_1$ of the recesses 15 in the slide members 14 slide along the inclined surfaces $15_1$ and thus thrust the slide members 14 radially in the direction of the longitudinal axis of the mandrel until the projections $14_1$ of the slide members 14 are sufficiently retracted to permit ejection of the machined member P. The ejection action may be produced by an air jet which is projected through the mandrel in the direction arrow fd. It will be noted that the centrifugal force applied to the weight members is reversed by the transmission by means of the spindles 16 to the slide members 14. The mass of the slide members 14 being less than that of the weight members 17, the slide members cannot escape from their housings in the body 8.

Gripping the Member P

Figure 2:
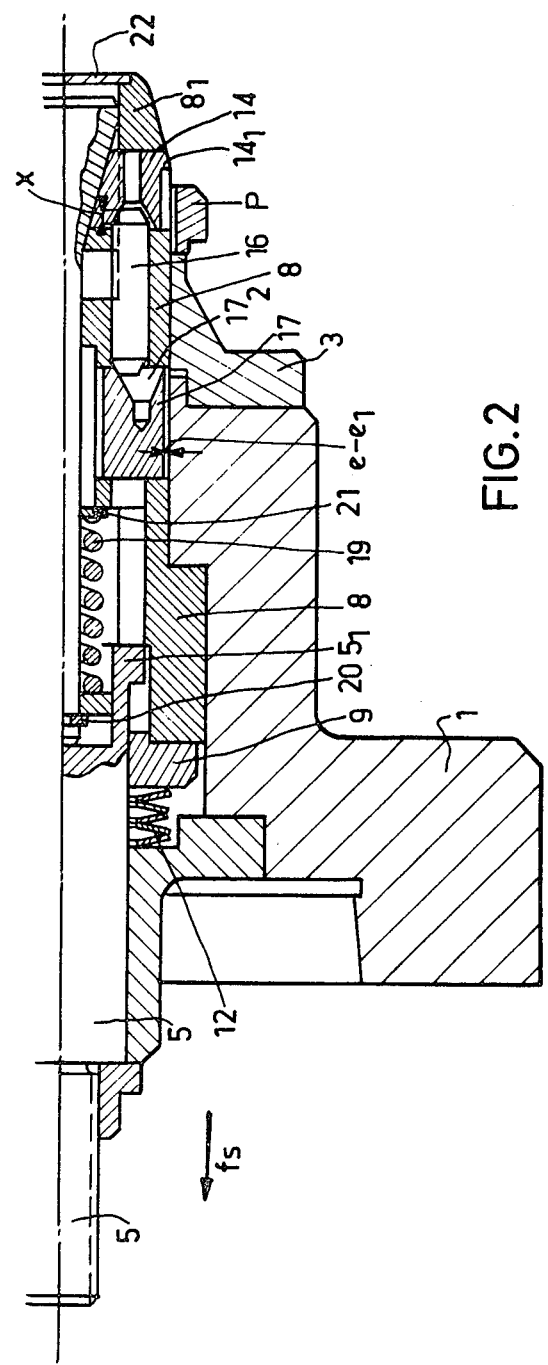

The member P machined having been ejected, a fresh member P is mounted on the front of the mandrel (see FIG. 2). The rod 5 is displaced in the direction indicated by the arrow fs (towards the left in the drawing), together with the gripping control piston 13 and the slide members 14. The spindles 16 are urged towards the left (FIG. 2) by the slide members 14 and move the weight members toward the longitudinal axis of the mandrel by a distance equal to e; centering of the member P to be machined is then produced by the action of the piston 13 and the slide members 14. The centering force applied by the slide members is a function of the slope $13_1$ of the conical portion of the piston 13 and the force of the spring 19. When the rod 5 has moved in the direction indicated by the arrow fs over a sufficient distance as no longer to remain in contact with the rearward face of the piston 13 so that the radial centering clearance b is re-established, the piston 13 having been retracted under the action of the spring 9, with the member P being perfectly centered. The rod 5 then continues its movement in the direction of the arrow fs against the spring 12; clearance a is produced between the mandrel body 8 and the plate 1 and face gripping of the member P is effected between the rearward faces of the projections $14_1$ of the slide members 14 and the abutment 3 which is fixed on the plate 1.

A large number of modifications and improvements may be made in the mandrel described hereinbefore by way of example, without thereby departing from the scope of the invention.

What is claimed is:

1. An expansible mandrel for loading and unloading a work member while the mandrel is rotating, said mandrel comprising:
   a frame having an abutment;
   a mandrel body slidable forwardly and rearwardly in said frame;
   at least two slide members mounted for radial movement within first recesses in said body, said slide members each including:
   a radial projection for pressing the work member against said abutment, and
   an inclined surface facing radially inwardly;
   a piston movable forwardly and rearwardly relative to said body, said piston including inclined surface means engageable with said inclined surfaces of said slides;
   a first spring arranged for urging said piston rearwardly to bring said inclined surface means into engagement with said inclined surfaces and urge said slides radially outwardly into engagement with the work member;
   a second spring for urging said body and slides forwardly;
   a coupling rod movable:
   forwardly by a first distance to become disengaged from said body to enable said body and slides to be pushed forwardly by said second spring, and further by a second distance to push said piston forwardly against the bias of said first spring,
   rearwardly by said second distance to enable said first spring to push said piston rearwardly, and further by said first distance to engage said body to pull the latter rearwardly;
   weight members mounted in second recesses of said body for radial movement;
   a mechanical linkage operably interconnecting said weight members and respective ones of said slides such that centrifugally-induced radial outward movement of said weight members produces radial inward movement of said slides and their projections when said piston is moved forwardly by said control rod and out of engagement with said slides, said linkage effecting radial inward movement of said weight members in response to radial outward movement of said sleeves produced by said piston when said coupling rod is moved rearwardly.

2. A mandrel according to claim 1, wherein said linkage comprises a movement transmission member having a first end received in a first recess disposed in a forward end of each weight member, and a second end disposed in a second recess disposed in a rear end of a respective slide, said first recess having a first ramp which extends longitudinally rearwardly and radially outwardly, and said second recess having a second ramp which extends longitudinally forwardly and radially outwardly such that centrifugally-induced radial outward movement of a weight member produces longitudinal forward movement of said transmission member which displaces said slides radially inwardly.

3. A mandrel according to claim 2, wherein said movement transmission member comprises a spindle whose first and second ends are of frustoconical configuration and of a length sufficient to retain said slide in its aperture upon total release of the work member.

4. A mandrel according to claim 2, wherein said transmission member comprises a series of adjacent balls.

5. A mandrel according to claim 2, wherein said first and second ramps are defined by conical recesses provided in said weight member and said slide member.

6. A mandrel according to claim 1, wherein each weight member is heavier than the corresponding slide.

7. A mandrel according to claim 2, wherein said weight members are identical, said transmission members are identical, and said slides are identical.

8. A mandrel according to claim 1, wherein said mandrel includes means for directing a jet of compressed air against the work member to eject the latter when released.

9. A mandrel according to claim 1, wherein said coupling rod has a recess at its forward end whose bottom is arranged to act against the piston after said coupling rod has been moved forwardly by a preselected radial centering clearance after releasing the mandrel, said coupling rod including an edge portion, the rearward face of which acts against said body to displace the latter rearwardly.

10. A mandrel according to claim 1, wherein a safety clearance is provided between said body and said frame to accommodate rearward movement of said body when the mandrel is not loaded with a work member.

11. An expansible mandrel for loading and unloading a work member while the mandrel is rotating, said mandrel comprising:
 a frame,
 a mandrel body slidable forwardly and rearwardly in said frame,
 gripping means for longitudinally and radially gripping the work member and comprising:
  a plurality of slides mounted in first recess means of said body for radial movement relative thereto and for radially gripping the work member when moved radially outwardly, said slides including radial outward projections for urging the work member longitudinally against said frame in response to rearward movement of said body,
  weight means mounted in second recess means of said body for radial movement relative thereto,
  means interconnecting said weight means and said slides to displace the latter radially inwardly in response to radial outward displacement of said weight means, and
 control means operably connected to said gripping means and said body and movable, while said mandrel roates, to:
  a release mode moving said body and said slides and their projections longitudinally forwardly relative to said frame to longitudinally release the work member, while permitting said slides and projections to be moved radially inwardly in response to centrifugally-induced radially outward displacement of said weight means to radially release the work member, and
  a gripping mode moving said body and said slides and their projections rearwardly relative to said frame to longitudinally grip the work member, and moving said slides radially outwardly and said weight means radially inwardly to radially grip the work member.

* * * * *